Nov. 15, 1955 C. E. WEEKS 2,723,860
TRACTOR MOUNTED BROADCAST SEEDER
Filed June 3, 1952 2 Sheets-Sheet 2

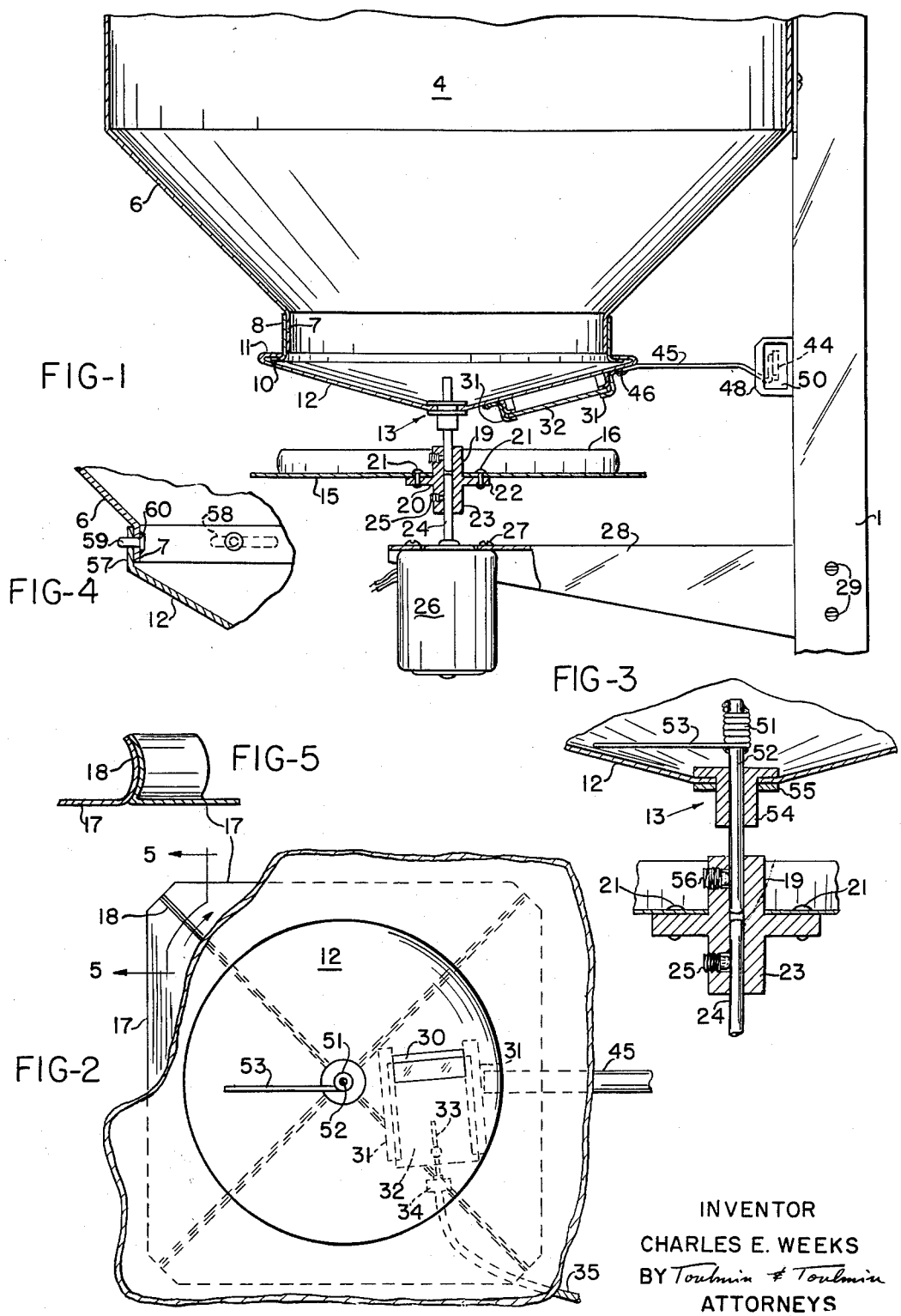

INVENTOR
CHARLES E. WEEKS
BY Toulmin & Toulmin
ATTORNEYS

United States Patent Office 2,723,860
Patented Nov. 15, 1955

2,723,860

TRACTOR MOUNTED BROADCAST SEEDER

Charles E. Weeks, Union, Ohio

Application June 3, 1952, Serial No. 291,480

3 Claims. (Cl. 275—8)

The present invention relates to power-operated farm equipment and more particularly to a power-operated seeding device of the broadcast type which may be attached to a tractor or other type of power vehicle. This invention represents an improvement over the seeder shown in my Patent No. 2,561,002 granted July 17, 1951.

While there are many types of mechanized seeding devices for specialized work and particular types of crops, there have been relatively few power seeders of the broadcast type. Power operated seeders of this type have heretofore been considered impractical, since seed was distributed throughout a full 360 degree angular movement. When such devices were attached to tractors or other power vehicles, considerable seed was wasted by deposit upon parts of the tractor or other supporting vehicle.

Power seeders are difficult to operate by unskilled labor, particularly in making the necessary adjustments to accommodate the various sizes, shapes and weight of seed, also in determining the angle of broadcast so as to prevent seed from being directed toward the tractor. There are many variables dictating these adjustments, not only in regard to the character of the seed, but also the speed and direction of rotation of the broadcasting disc, as no exact predetermination can be made beforehand in case these various factors change.

In accordance with my invention, these adjustments which require changing the size and location of the seed opening in the hopper are individually made in a simple but effective manner in order to accommodate the seeder to all changes in operating conditions and thereby obtain optimum efficiency. Thus these variables are accounted for and individually separated from one another by reason of the individual adjustments.

The primary object of the invention is to provide a power seeder of the broadcast type having a seed hopper with an opening in the bottom and a cooperating broadcasting disc, together with a means for accommodating the opening to seed of different character, size, shape, weight, etc., and to different angles of broadcast, depending on the speed and direction of rotation of the disc.

Another object is to provide a power seeder of the broadcast type having a seed hopper with an opening in the bottom, the size and position of which with respect to the hopper can be independently adjusted, depending upon the seed and disc variables that are encountered in the operation of the seeding machine.

Still another object is to provide a power seeder of the broadcast type having a seed hopper with an opening in the bottom and a cooperating broadcasting disc, together with separately operated hand adjustments for moving the opening across the bottom of the hopper and for changing the size of the opening in a simple, direct and efficient manner.

Another object is to provide a power seeder of the broadcast type having a seed hopper with an opening in the bottom, a broadcasting rotary disc located under the opening, together with a means for adjustably moving the opening laterally across the bottom of the hopper, and an independently operable means for changing the size of the opening in order to accommodate seed of different character and to regulate the angle of broadcast.

Another object is to provide a power seeder of the broadcast type having a seed hopper with an opening in the bottom and a cooperating broadcasting disc, together with two separately operating means for moving the opening across the bottom of the hopper and for changing the size of the opening, together with a device for preventing the seed from bridging the opening.

Still another object is to provide a power seeder of the broadcast type having a seed hopper and a cooperating broadcasting disc, together with an improved structure by which the seed is adjustably fed from the hopper to the disc in accordance with the size, character and weight of seed and the desired degree of broadcast.

Another object is to provide a power seeder of the broadcast type having a seed hopper and a cooperating broadcasting disc, together with an opening in the hopper for feeding the seed to the disc, and means within the hopper for preventing the opening from being bridged by seed.

The final object of the invention is to provide a power seeder of the broadcast type having a seed hopper with an opening in the bottom and a cooperating rotatable broadcasting disc together with an agitator rotatably mounted within the hopper to prevent the opening from being bridged by the seed, the agitator and disc being located on the same shaft and rotated by a common source of power.

The invention will be better understood when reference is made to the following description and the accompanying drawings, in which:

Figure 1 is a sectional view, partly in elevation, of the lower end of the hopper, including the broadcasting structure. This section is taken along line 1—1 in Fig. 6 and looking in the direction of the arrows;

Figure 2 is a fragmentary plan view looking down into the hopper and showing the agitator, the seed opening and its slide plate member;

Figure 3 is a sectional view of the bottom of the hopper and disc but showing the agitator and its shaft in elevation;

Figure 4 is a fragmentary sectional view of a modified form of the lower portion of the hopper and the rotatable plate or bottom member;

Figure 5 shows in perspective but partly in section, one of the blades on the broadcasting disc. This view is taken along line 5—5 in Figure 2;

Figures 6, 7:
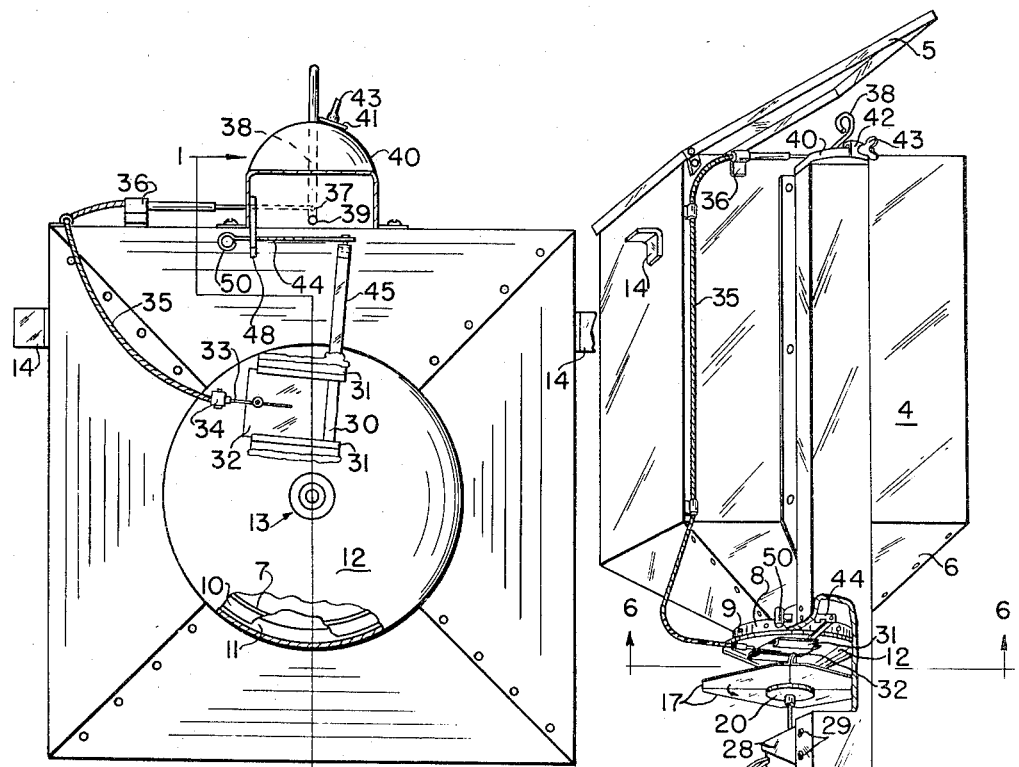
Figure 6 is a bottom plan view of the hopper showing the opening closed by the slide member. This view is taken along line 6—6 in Figure 7 and looking in the direction of the arrows.
Figure 7 represents a perspective view of the improved seeder.

Referring to the drawings, particularly Figs. 1 and 7, the seeder is supported upon a heavy U-shaped upright member 1 having a lateral extension 2 at the bottom and braced at 3 for being removably secured to the draw bar (not shown) of a tractor. It will be understood that the tractor normally precedes the seeder, although the latter can be attached, if desired, to the forward end of the tractor in any suitable and well known manner when proper adjustments in the seeding operation are made.

The seed hopper preferably takes a rectangular form as indicated at 4 and is made of sheet iron, preferably galvanized, the sides being bent to form and welded or secured together in any suitable manner.

A cover 5 having edgewise ribs is hingedly mounted on the hopper at the top. The lower part of the hopper comprises a pyramidally shaped portion or funnel indicated at 6 which terminates in a circular collar member 7. There is a sleeve 8 surrounding the collar and secured thereto by rivets 9 (Fig. 7), this sleeve being provided with an outwardly extending flange or ledge 10 at the bottom. This circular ledge serves as a support for an over-hanging lip 11 of a conically-shaped bottom plate 12 so that the latter is adapted freely to turn on the ledge 10. These various parts are made preferably of the same material as that of the hopper.

At the lower apex of the conical member 12 there is an opening for a bearing indicated generally at 13 which will be described in connection with the broadcasting disc.

As explained hereinbefore, the seeder mechanism, including the hopper, is attached as at 2 to the draw bar or other frame portion of the tractor. The upper end of the seeder is provided with a pair of oppositely positioned lugs 14 of an angular shape to which brace rods (not shown) may be attached leading to any suitable position on the tractor. Thus the seeder as a whole is rigidly supported from the rear end of the tractor by the brace bars at the top and the bolted coupling at the bottom.

*The seed distributing mechanism*

Directly below the bearing 13 there is a seed broadcasting apparatus constituted of a disc 15 from which extend from the upper surface four quadrantly positioned ribs 16, although it will be understood that as many ribs may be provided as is desired, depending upon the speed of the disc and other factors. For manufacturing reasons the disc is formed of four triangular shaped plates 17, the edges of which are bent upwardly as indicated at 18 (Fig. 5) and given a curved configuration, the concavity of which extends in the direction of rotation of the disc. Thus these blades provide a scooping effect on the seed which is dropped on the disc from the hopper in a manner to be described hereinafter.

The overhanging edge of the ribs serves to prevent the seed from being propagated in the vertical direction. The ribs of the adjacent edges of the triangular plates may be welded or riveted together so that the triangular plate members are attached together at the ribs to form an integral rectangular disc. There is an opening at the center of the disc to receive the hub 19 of a shouldered member 20, these quadrantal plates being preferably riveted as indicated at 21 to a horizontal flange 22 of the shouldered member.

There is a downwardly extending hub 23 provided in line with the upwardly extending hub 19. A shaft 24 extends through a central opening in the member 20 and is secured thereto by a set screw 25, this shaft constituting the drive shaft of a motor 26. The latter is screwed as at 27 to a U-shaped tapered leg bracket 28 which is secured as indicated at 29 to the upright 1. It is apparent that as electrical energy is supplied to the motor 26, the disc 15 is caused to rotate at a fast speed and seeds that are dropped from the hopper 4 are caused by centrifugal action to be propelled into space and to be distributed over a predetermined pattern on the ground.

As explained above, the curvilinear ribs 16 cause the seed to leave the disc 15 in practically a horizontal direction and prevent the seed from leaving the disc in a vertical or angular direction.

It is desirable that as the disc rotates the seed will leave the disc over a horizontal angle represented by less than 360°. None of the seed should be permitted to reach the tractor, for otherwise it would be lost so that there should be a blind angle forward of the seeder and the boundaries of which are determined by the contour of the tractor over which no seed will be propelled. This blind angle or seed shadow is obtained by properly orienting the seed opening in the conical bottom plate 12 of the hopper.

*Seed opening and control mechanism*

The position of the seed opening is determined by many factors including the character, size and weight of seed, the speed and character of the broadcasting disc and the direction of rotation of the disc. Other factors of perhaps lesser importance are also involved. As shown in Figs. 2 and 6, the opening 30 is not symmetrically positioned with respect to the circular plate 12 but is to one side of the diametral line. While this opening may have a circular or other configuration, I find it desirable, mainly for adjustment reasons, to form an opening of rectangular shape.

Figure 8:
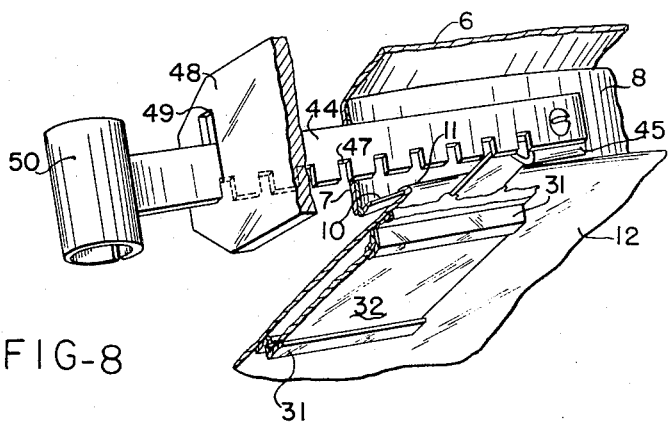
Figure 8 is an enlarged fragmentary perspective view, partly in section, of the slide member and the lever mechanism for operating the member.

Along the sides of the opening there is a pair of oppositely disposed U-shaped retaining members 31 (Fig. 8) welded or otherwise secured along one edge to the lower surface of the plate 12. It may be necessary to build up portions of the conical plate to present a flat surface for receiving the members 31 or suitable brackets may be employed for this purpose.

A slidable plate 32 is introduced between the U-shaped ledges, this plate being of a size such as to fully open or fully close the opening 30 as the plate is moved from one extreme position to the other. A flexible rod 33 is secured to one of the free ends of the slide member 32, this rod passing through a guide bracket 34 and being protected on the exterior by a wound wire casing 35. The rod 33 and its casing are taken through a second guide bracket 36 secured to the upper edge of the hopper. The wire is attached to an intermediate portion 37 of a swingable lever 38 which is pivoted at 39 to a plate 40. The latter is secured in any suitable manner to the upper portion of the upright frame member 1. Thus as the lever 38 is swung about its pivot 39, it will pull or push on the rod 33, depending upon the position of movement of the lever so that the slide member 32 can be moved along its U-shaped seats 31.

In order that there will be no lost motion at the lever 38 in moving the slide member 32 from the fully opened to the fully closed position and vice-versa, limits of travel of the lever may be imposed. A stop member 41 comprising a strip of metal, which is also pivoted at 39 but underneath the plate 40, may be employed, this strip having an upstanding end indicated at 42 which is bent over and cooperates with a lip on the plate 40 so as to form an abutment for the handle portion of the lever 38. This strip (not shown) is adapted to swing around the lip on the plate 40 and can be adjustably held at any desired position by means of a wing nut and screw indicated at 43.

In practice, this stop or abutment strip is used mainly to control the maximum opening that can be obtained by sliding the plate along the ledges 31. This, in turn, limits the amount of seed that is being momentarily dropped on to the distributing disc and thereby conserves the seed to that actually required. In Fig. 6, the lever 38 is shown in abutting relation to the upstanding end of the stop member 41, leaving an opening 30 of maximum size. This opening can be completely closed, as when it is desired to stop broadcasting the seed, or may be set to any other predetermined size by simply rotating the lever 38 counterclockwise to a new position.

In general, the size of this opening will be dependent upon many factors, including the character, weight and size of the seed, also the speed and direction of the broadcasting disc so that this size is preferably determined by experiment.

*Broadcast angle adjustment mechanism*

As explained hereinbefore, it is desirable that the seed be propelled or distributed over a limited angle, leaving a so-called blind angle over which the seed is not distributed and as represented by the contour of the tractor.

This angle of distribution is determined to some extent by the size of the opening 30 but more especially by the position of the opening 30 with respect to the central axis of the broadcasting disc.

In accordance with another feature of my invention, means is provided by which the location of the opening can be varied, depending upon practical considerations and this means is operable independently of the mechanism by which the size of the opening is changed. It has been explained that this opening is contained in the bottom conical plate 12 of the hopper and the latter is rotatable at the ledge 10. The wire 33 prevents no restriction in rotating the plate on account of its flexible character.

In order to rotate the plate in adjustable amounts, there is provided a strap 44 which is secured through a connecting strip 45 to the lower surface of the plate 12 as indicated at 46. This strap is provided at its lower edge with slots 47 which are adapted to be received by a catch 48 having a rectangular opening 49 of greater length than the width of the strap. The latter terminates in any suitable type of handle 50. Thus, by elevating the handle, the slot 47 is disengaged from the catch 48 and by either pushing or pulling the strap, a limited rotation of the bottom plate member 12 is effected.

The opening 30 is therefore caused to move laterally across the bottom of the hopper and thus the location of the opening is changed with respect to the axis of the broadcasting disc. The proper position of this opening as effected by moving the strap 44 is best determined by experiment. In general, this lateral movement of the opening, and to some degree, the amount of opening, determines the angular limits of the seed broadcast and, in general, should extend as far as possible except for the blind angle represented by the contour of the tractor and with a certain amount of angle margin on both sides of the tractor.

Agitator

It has been found, particularly in the case of a stationary hopper and a movable bottom plate as described hereinbefore, that there is some tendency for the seed to bridge the opening 30 and to stop falling through this opening by gravity. This is particularly true in cases where the opening is fairly small, depending on the fineness of the seed.

In accordance with still another feature of my invention, I have provided an agitator which may comprise a coil 51 of fairly rigid wire wound to a diameter such as to snugly fit over a shaft 52. This coil terminates in an outstanding leg 53 so that as the shaft is rotated, the leg 53 keeps the seed in constant agitation and thus prevents the seed from sticking together in the neighborhood of the opening 30. A fine constant stream of the seed through the opening is therefore assured. The shaft 52 is loosely taken through a bushing 54 having a shoulder which fits tightly in the opening 13 formed at the bottom of the plate 12.

If desired, a washer 55 which tightly surrounds the shoulder 54 can be secured, as by welding or riveting, to the bottom of the plate 12 in order to hold the bushing rigidly in place. The shaft 52 extends into the hub 19 to which it is secured by a set screw 56. Thus, as the motor 26 is operated and the shaft 24 rotates, the distributing disc 15 is likewise caused to rotate and carry with it the flail 53 within the lower portion of the hopper.

In Fig. 4 there is shown a modified form of a swivable joint that can be employed to advantage between the bottom plate 12 and the circular collar 7 of the hopper. The bottom plate is provided with an upstanding flange 57 of an interior diameter slightly larger than the collar 7. The flange has four or more elongate openings or slots 58 symmetrically located around the flange. Pins 59 extend through the slots, these pins having heads 60 which are welded or otherwise secured to the inner peripheral surface of the collar. It is apparent that the plate 12 can be rotated by pulling on the strap 44 (Fig. 8) through a limited distance determined by the length of the slots 58 and yet the plate is held from being dropped from the collar.

From the foregoing it is apparent that I have disclosed a manual control of the size of the seed opening in the bottom of a stationary hopper and have also provided a separate manual control over the location of the opening with respect to the hopper. The latter is brought about by a rotatable bottom in the hopper which upon being rotated, serves in effect to move the opening in a lateral direction over a limited range and this bodily movement of the opening takes place without any interference with the mechanism which changes the size of the opening. Both the opening movement and the change in size of opening can be performed simultaneously or independently of one another. Thus the rate of propagation of the seed and the angle of broadcast of the seed are under exact control and either or both of these factors can be changed at will in accordance with changes in seed conditions or changes in the broadcasting effect of the rotating disc.

In still another aspect of my invention, I have provided a flail device or rotating leg for whipping the seed and insuring a fine, steady flow of the seed through the seed opening so as to insure a uniform broadcast of the seed.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A tractor mounted broadcast seeder including a horizontally disposed rotary distributing disc having ribs extending radially over its entire face, a stationary seed hopper positioned directly above the ribbed face of said disc, said hopper being closed at the bottom by a plate which is rotatable over a limited range with respect to the hopper, a single rectangular opening in said plate positioned away from the center of the plate, a rectangular slide member adapted to uncover predetermined portions of said opening, means for rotating said plate over said limited range to cause the opening and its slide member to move across the disc in a direction laterally of the tractor, and means operated independently of the opening-moving structure for operating said slide member to adjust the size of the opening, said slide member being maintained stationary except when the slide is being moved relative to the seed hopper by either of the last mentioned means.

2. A tractor mounted broadcast seeder including a horizontally disposed rotary distributing disc having ribs extending radially over its entire face, a stationary seed hopper positioned directly above the ribbed face of said disc, said hopper being closed at the bottom by a plate which is rotatable over a limited range with respect to the hopper, a single opening in said plate, said opening being positioned forward of the center of the disc and movable across said disc in a direction laterally of the tractor when said plate is moved whereby seed dropped from the hopper through said opening onto said disc is distributed over a circular path except for a blind angle represented by the boundary of the tractor, means for rotating the plate throughout is limited range to move said opening across said disc in a direction laterally of the tractor, the lateral movement of said opening being confined to an area represented by the front half section of the disc, and means operated independently of the opening-moving structure for controlling the size of the opening.

3. In combination, a seed hopper for a broadcast seeder including a horizontally disposed rotary distributing disc, the hopper being stationarily positioned over the disc to drop seed thereon, said hopper terminating in a circular plate having a single seed opening remote from the center of the plate, said circular plate being secured to the hopper by a swivable joint whereby the plate can be rotated with respect to the hopper, means at one end of the hopper for rotating the plate to predetermined positions with respect to the hopper in order to move the seed opening laterally with respect to the hopper, and means positioned at the opposite end of the hopper for changing the size of the seed opening, said means operating independently of one another.

References Cited in the file of this patent

UNITED STATES PATENTS

| | | |
|---|---|---|
| 1,166,477 | Parrish | Jan. 4, 1916 |
| 2,234,343 | Harrington | Mar. 11, 1941 |
| 2,463,855 | Crawford | Mar. 8, 1949 |
| 2,547,143 | Speicher | Apr. 3, 1951 |
| 2,560,431 | Garber | July 10, 1951 |
| 2,561,002 | Weeks | July 17, 1951 |
| 2,561,145 | Shaw | July 17, 1951 |